L. L. WILSON & L. S. KEAGLE.
Fishing and Wharf Lamp.

No. 196,613          Patented Oct. 30, 1877.

WITNESSES:
C. Neveux
J. H. Scarborough

INVENTORS:
L. L. Wilson
L. S. Keagle
BY Mun & Co
ATTORNEYS.

UNITED STATES PATENT OFFICE.

LEONIDAS L. WILSON AND LEVI S. KEAGLE, OF CENTRE POINT, IOWA.

IMPROVEMENT IN FISHING AND WHARF LAMPS.

Specification forming part of Letters Patent No. 196,613, dated October 30, 1877; application filed September 22, 1877.

*To all whom it may concern:*

Figure 1:
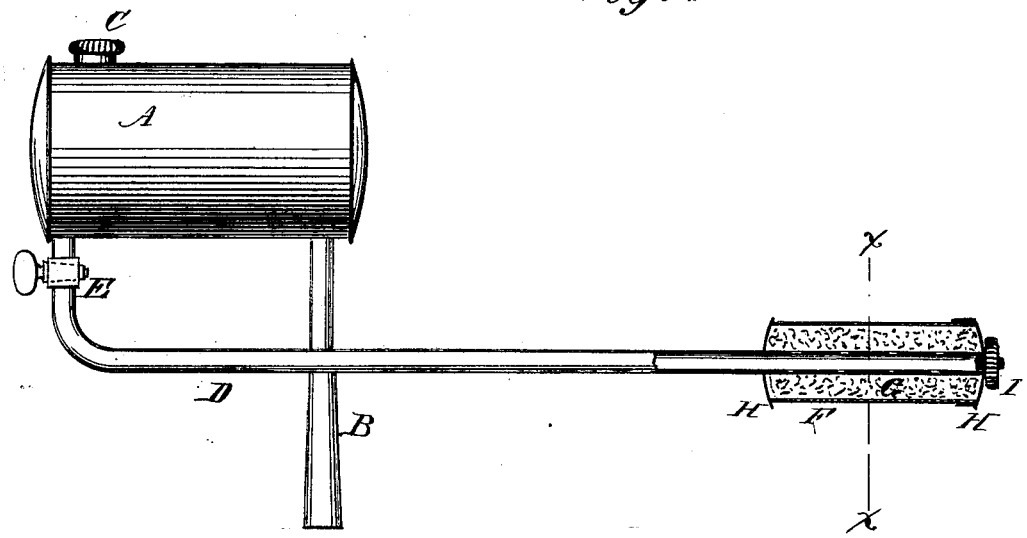
Figure 2:
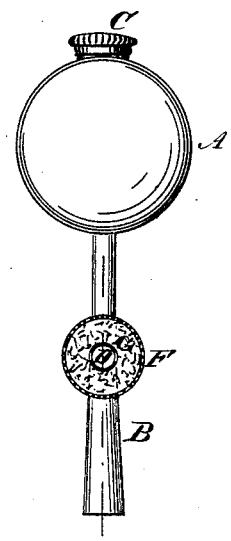

Be it known that we, LEONIDAS L. WILSON and LEVI S. KEAGLE, of Centre Point, county of Linn, and State of Iowa, have invented a new and Improved Fishing and Wharf Lamp, of which the following is a specification:

Figure 1 is a side elevation of our improved lamp, showing a longitudinal section of the wick-holder. Fig. 2 is a front elevation, in section, on line $x\ x$ in Fig. 1.

Similar letters of reference indicate corresponding parts.

The object of our invention is to provide an improved lamp for fishing and dock purposes.

In the drawing, A is a reservoir for oil, which is provided with a socket, B, for receiving the staff by which it is supported. The reservoir is also provided with a screw-cap, C, which is removed whenever the reservoir is filled. A tube, D, having the stop-cock E, is attached to the reservoir, and is bent so that it extends horizontally. The outer end of the tube is plugged, and its sides are perforated for a short distance near the end. A wire-gauze tube, F, containing a filling, G, of asbestus, surrounds the perforated portion of the tube D, and is retained in place by caps H, that cover each end, and the whole is retained by a nut, I, fitted to the end of the tube.

The amount of oil supplied to the asbestus wick is controlled by the stop-cock E. The asbestus wick is indestructible, and cannot burn out, but if, in the course of time, it becomes clogged with dirt or gum from the oil, it may easily be removed and cleaned or replaced.

Having thus fully described our invention, we claim as new and desire to secure by Letters Patent—

1. The wire-gauze tube F and asbestus filling G, in combination with the perforated tube D, substantially as shown and described.

2. The reservoir A, tube D, perforated as described, and having the stop-cock E, the wire-gauze tube F, having cap H, and containing the asbestus filling G, in combination, as specified.

LEONIDAS LUCIUS WILSON.
LEVI SPENCER KEAGLE.

Witnesses:
W. F. FITZGARRALD,
C. P. WILSON.